(12) United States Patent
Desai et al.

(10) Patent No.: US 11,780,956 B2
(45) Date of Patent: Oct. 10, 2023

(54) BUILD MATERIALS FOR ADDITIVE MANUFACTURING APPLICATIONS

(71) Applicant: Eastman Chemical Company, Kingsport, TN (US)

(72) Inventors: Amit Vasant Desai, Sugar Land, TX (US); Andrew Thomas Detwiler, Kingsport, TN (US); Steven Frederick Wright, Johnson City, TN (US); Everett B. Shepard, Nickelsville, VA (US)

(73) Assignee: Eastman Chemical Company, Kingsport, TN (US)

( * ) Notice: Subject to any disclaimer, the term of this patent is extended or adjusted under 35 U.S.C. 154(b) by 127 days.

(21) Appl. No.: 16/979,922

(22) PCT Filed: Mar. 7, 2019

(86) PCT No.: PCT/US2019/021072
§ 371 (c)(1),
(2) Date: Sep. 11, 2020

(87) PCT Pub. No.: WO2019/177850
PCT Pub. Date: Sep. 19, 2019

(65) Prior Publication Data
US 2021/0009754 A1    Jan. 14, 2021

Related U.S. Application Data

(60) Provisional application No. 62/642,336, filed on Mar. 13, 2018.

(51) Int. Cl.
| C08G 63/02 | (2006.01) |
| B33Y 10/00 | (2015.01) |
| B33Y 70/00 | (2020.01) |
| B29C 64/153 | (2017.01) |
| C08G 63/16 | (2006.01) |
| C08G 63/199 | (2006.01) |
| B29K 69/00 | (2006.01) |
| B29K 105/00 | (2006.01) |

(52) U.S. Cl.
CPC ............ *C08G 63/02* (2013.01); *B29C 64/153* (2017.08); *B33Y 10/00* (2014.12); *B33Y 70/00* (2014.12); *C08G 63/16* (2013.01); *C08G 63/199* (2013.01); *B29K 2069/00* (2013.01); *B29K 2105/005* (2013.01); *B29K 2105/0032* (2013.01); *B29K 2105/0044* (2013.01); *B29K 2995/004* (2013.01); *B29K 2995/0039* (2013.01)

(58) Field of Classification Search
CPC .... C08G 63/199; C08G 63/16; C08G 63/183; B29C 64/153; B33Y 10/00; B33Y 70/00; B33Y 80/00; B29K 2069/00; B29K 2105/0032; B29K 2105/0044; B29K 2105/005; B29K 2995/0039; B29K 2995/004

See application file for complete search history.

(56) References Cited

U.S. PATENT DOCUMENTS

| 5,990,268 | A | 11/1999 | Dickens, Jr. et al. |
| 6,100,411 | A | 8/2000 | Ojima |
| 7,906,063 | B2 | 3/2011 | Monsheimer et al. |
| 8,114,334 | B2 | 2/2012 | Martinoni et al. |
| 8,592,519 | B2 | 11/2013 | Martinoni |
| 9,561,625 | B2 | 2/2017 | Martinoni |
| 9,580,551 | B2 | 2/2017 | Vanelli et al. |
| 2007/0129531 | A1 | 6/2007 | Germroth et al. |
| 2010/0160547 | A1 | 6/2010 | Martinoni |
| 2012/0329980 | A1 | 12/2012 | George et al. |
| 2015/0252190 | A1* | 9/2015 | Rodgers ................ B33Y 10/00 524/592 |
| 2017/0066873 | A1 | 3/2017 | Gardet |
| 2018/0230274 | A1 | 8/2018 | Liu et al. |
| 2021/0009754 | A1 | 1/2021 | Desai et al. |
| 2021/0069860 | A1* | 3/2021 | Chaudhari .......... C08F 290/067 |
| 2021/0107216 | A1* | 4/2021 | Chaffins ................ B29C 64/165 |
| 2021/0138725 | A1* | 5/2021 | Erickson ................ B33Y 30/00 |
| 2021/0170691 | A1* | 6/2021 | Lebron .................. B33Y 10/00 |
| 2021/0206114 | A1* | 7/2021 | Schramm ............... B33Y 50/00 |
| 2021/0283834 | A1* | 9/2021 | Van Brocklin ........ B33Y 10/00 |

(Continued)

FOREIGN PATENT DOCUMENTS

| KR | 20060072547 A | 6/2006 |
| WO | WO 2016/112283 A1 | 7/2016 |
| WO | WO 2017/220228 A1 | 12/2017 |

OTHER PUBLICATIONS

ASTME1356; "Standard Test Method for Assignment of the Glass Transition Temperatures by Differential Scanning Calorimetry"; Published Apr. 2014.
ASTMF2625-10; "Standard Test Method for Measurement of Enthalpy of Fusion, Percent Crystallinity, and Melting Point of Ultra-High-Molecular Weight Polyethylene by Means of Differential Scanning Calorimetry"; Published Apr. 1, 2016.
ASTMD638; "Standard Test Method for Tensile Properties of Plastics" Published Mar. 2015.
Jones, L. D., et al. "Heat of Fusion of Lexan Polycarbonate"; Polymer Letters vol. 4, (1966), pp. 803-808.

(Continued)

*Primary Examiner* — Nahida Sultana
(74) *Attorney, Agent, or Firm* — Robert C. Morriss

(57) ABSTRACT

A build material for additive manufacturing applications is disclosed. The build material includes a build composition in powder form. The build composition includes a semi-crystalline polymer having a glass transition temperature of at least 60° C. as measured by DSC and a minimum crystallization half-time of greater than 100 minutes as measured by SALS. A semi-crystalline polymer useful in additive manufacturing applications, an additive manufacturing method for producing a three-dimensional object and an additive-manufactured polymer article are also described.

11 Claims, No Drawings

(56) References Cited

U.S. PATENT DOCUMENTS

2021/0331383 A1* 10/2021 Flack ................... B33Y 70/00
2021/0339463 A1* 11/2021 Hikmet ................. B33Y 10/00
2022/0169785 A1   6/2022 Goetz et al.

OTHER PUBLICATIONS

Mercier, J. P., et al., "Correlation between the enthalpy of fusion and the specific volume of crystallized poly-carbonate of bisphenol A."; Polymer Letters vol. 8, (1970), pp. 645-650.
Notification of Transmittal of the International Search Report and the Written Opinion of the International Searching Authority dated May 23, 2019 for International Application No. PCT/US2019/021072.
Co-pending U.S. Appl. No. 17/597,442, filed Jan. 6, 2022; Goetz et al.; Publication No. 2022-0169785.
Notification of Transmittal of the International Search Report and the Written Opinion of the International Searching Authority dated Oct. 5, 2020 for International Application No. PCT/US2020/041100.
ASTM D3418; "Standard Test Method for Transition Temperatures and Enthalpies of Fusion and Crystallization of Polymers by Differential Scanning Calorimetry"; Published Sep. 2021.

* cited by examiner

BUILD MATERIALS FOR ADDITIVE MANUFACTURING APPLICATIONS

CROSS-REFERENCE TO RELATED APPLICATION(S)

This application is a national stage filing under 35 USC § 371 of International Application Number PCT/US2019/021072, filed on Mar. 7, 2019 which claims priority to U.S. Application 62/642,336, filed on Mar. 13, 2018, the entire disclosures of which are incorporated by reference herein.

FIELD OF THE INVENTION

The present invention generally pertains to a build material and a semi-crystalline polymer useful for additive manufacturing applications.

BACKGROUND OF THE INVENTION

3-D printing, also known in the art as additive manufacturing, refers to a class of processes for the production of three-dimensional objects wherein multiple layers of a material known as a "build material" are applied to a bed or substrate on a layer-by-layer basis. Such processes are particularly useful in the manufacture of prototypes, models and molds; however, more recently these processes have been increasingly utilized for production parts, consumer products, medical devices and the like.

One recognized and widely practiced additive manufacturing process is known in the art as laser sintering. In general, laser sintering involves applying a layer of powdered or pulverulent polymer material to a target or build surface; heating a portion of the material; irradiating selected or desired part locations/shape with laser energy to sinter those portions and produce a part "slice"; and repeating these steps multiple times (the repetition often referred to as the "build") to create useful parts in the form of sequentially formed, multiple fused layers. Laser sintering is described for example in U.S. Pat. Nos. 6,100,411; 5,990,268 and 8,114,334, the descriptions and disclosure of which are hereby incorporated herein by reference. Additive manufacturing processes that utilize other irradiation energy sources such as infrared radiation are also known in the art. Fusion could be complete or partial fusion.

The prior art describes in detail the intimate interrelationship and tenuous balance between various temperatures used in laser sintering processes and the temperature-related and/or temperature-dependent characteristics and parameters of the polymer powder such as glass transition temperature, melt temperature, crystallinity and rate of crystallization (and of recrystallization after melting). In describing a laser sintering method and system, U.S. Pat. No. 9,580,551, the description and disclosure of which is incorporated herein by reference, notes that if the system maintains the bed of powder at a temperature that is too low (e.g., too near such powder's recrystallization point), then the fused powder may return to a solid state (or "recrystallize") too quickly, which may cause the formed object to warp or deform. This patent further notes that, if the system maintains the bed of powder at a temperature that is too high (e.g., too near such powder's melting point), then the remaining unfused powder may partially melt, which may increase the relative difficulty of separating the remaining unfused powder from the formed object. This difficulty of separating in turn reduces the recyclability of the material or the ability to reuse the material. Avoidance of curl by maintaining temperature at "maximum uniformity" just below the melting point of the polymeric material is also described in U.S. Pat. No. 7,906,063. The above-referenced '268 patent defines a "window of sinterability" temperature range and notes that a major practical consequence of the narrowly defined window requires that the part bed be maintained at a specified temperature and with a specified temperature profile so that each layer to be sintered lies within the confines of the selective-laser-sintering-window. As described, a different temperature, whether higher or lower, and/or a different temperature profile, results in regions of the just-sintered initial slice of powder which will either cause an already sintered slice to melt and be distorted in a layer of the part bed which has "caked"; or, will cause an already sintered slice to curl if the part bed temperature is too low. Additionally, the '268 patent has related the rate of crystallization to the difference in temperature between the onset of melting and onset of recrystallization, while rate of crystallization is described as more correctly and closely related to fundamental polymer characteristics such as the crystallization half-time. Crystallization half-time is described as a more fundamental property of the polymer than the difference in melting and recrystallization endotherms, as this difference can be adjusted. In conclusion, the '268 patent provides that "it has been discovered that the rate of crystallization of the semicrystalline organic polymer is a key property in controlling curl and achieving dimensional control in the sintered part. Materials that recrystallize relatively slowly after melting exhibit sufficient dimensional stability and create near-fully dense, distortion-free parts in the selective laser sintering process."

While this conclusion may be indicative of the direction of development efforts in the field of polymer powder build materials for laser sintering, commercial product offerings to date have not relieved manufacturers from the burdens of meticulous process temperature control and the corresponding equipment and manufacturing costs, and the product quality issues such as warping and curling that can accompany failure to maintain such control.

SUMMARY OF THE INVENTION

In a first aspect, the present invention relates to a build material for additive manufacturing applications. The build material includes a build composition in powder form. The build composition includes a semi-crystalline polymer having a glass transition temperature of at least 60° C. when measured according to differential scanning calorimetry (DSC) and a minimum crystallization half-time of greater than 100 minutes as measured by small angle light scattering (SALS).

In a second aspect, the present invention relates to a semi-crystalline polymer useful in additive manufacturing applications. The polymer has a glass transition temperature of at least 60° C. when measured according to DSC and a minimum crystallization half-time of greater than 100 minutes as measured by SALS. The polymer may be in the form of a powder and/or may be a component of a polymer composition that is in the form of a powder.

In a third aspect, the present invention relates to an additive manufacturing method for producing a three-dimensional object. The method of the present invention includes the steps of:
  (a) applying a layer of a build material onto a target surface, said build material including a build composition in powder form that includes a semi-crystalline polymer;

(b) directing electromagnetic wave energy at selected locations of the layer corresponding to a cross-section of an object to be formed in the layer to sinter the build composition at the selected locations; and (c) repeating the applying and directing steps to form the part in layerwise fashion; wherein each applying and directing step is much shorter than the minimum crystallization half-time.

In a fourth aspect, the present invention related to a polymer article formed via an additive manufacturing process, referred to herein as an additive-manufactured polymer article. The polymer of the polymer article is amorphous and the article is formed from the build material of the present invention.

Further aspects of the invention are as disclosed and claimed herein.

DETAILED DESCRIPTION

In the first aspect of the present invention, the build material of the present invention includes a build composition in powder form. A suitable particle size range for the powder form of the build material is between 20 and 200 um as measured by DLS and a suitable median for the volume particle size distribution (referred to as $D_v[50]$) is from 40 to 80 µm as measured by dynamic light scattering (DLS). The build composition is present in the build material in the amount of from 40% to 100% by volume of the build material based on the total volume of the solids fraction of the build material. Additional but optional ingredients in the build material include one or more of crystallizing agents such as nucleating agents; colorants; heat and/or light stabilizers; heat absorbing agents such as heat absorbing inks; anti-oxidants, flow aids, and filler materials such as glass, mineral, carbon fibers and like. In an embodiment where the build composition is present in the build material in the amount of 100% by volume of the build material, the build material is the build composition in polymer form. Accordingly, in an embodiment, the build material may consist essentially of or consist of the build composition in powder form.

The build composition includes a semi-crystalline polymer which is a component of the build composition and which also constitutes a second aspect of the present invention. "Semi-crystalline" is defined as a polymer with crystallinity level of 1% or more as measured by DSC. Suitable semi-crystalline polymers for the present invention have a glass transition temperature ($T_g$) of at least 60° C. and a minimum crystallization half-time greater than 100 minutes and preferably are selected from the group consisting of polyesters, copolyesters, polycarbonates, and polyether ketones. Particularly suitable semi-crystalline polymers have a crystallinity of from 10% to 30%. The semi-crystalline polymer preferably has a minimum crystallization half-time ($t_{1/2}$) of from 500 to 5000 minutes. The semi-crystalline polymer is present in the build composition in the amount of from 60% to 100% by volume of the build composition based on the total volume of the solids fraction of the build composition. In an embodiment wherein the build composition includes 100% semi-crystalline polymer by volume based on the total volume of the solids fraction of the build composition, the semi-crystalline polymer is in the form of a powder and the build composition is a semi-crystalline polymer in powder form. Accordingly, in an embodiment, the build composition may consist essentially of or consist of the semi-crystalline polymer in powder form.

The semi-crystalline polymer in one embodiment is a crystallized amorphous polymer. "Crystallized amorphous polymer" is defined herein as a semi-crystalline polymer formed through inducement of crystalline structure in a polymer through solvent annealing crystallization. Crystallized amorphous polymers have a crystallinity level higher than that of the polymer before the crystallinity inducement process. Other methods for inducing crystalline structure in generally amorphous polymers known in the art, including for example solvent precipitation crystallization, thermal crystallization and strain crystallization and the like, may also be investigated for use by one of ordinary skill in forming a crystallized amorphous polymer.

Solvent annealing crystallization involves exposing a polymer to a low molecular weight (below about 500 g/mol) solvent vapor or solvent liquid to swell the polymer without substantially dissolving it or causing the polymer pellets to stick together. Selection of a suitable solvent for solvent annealing crystallization will depend in part on the polymer type to be crystallized. For example, acetone or methyl acetate are suitable choices of solvent for copolyesters and may be used either in pure form or as part of an aqueous system. A partially miscible solvent system can also be used to expand the range of solvent choices. The polymer can be maintained at the crystallization temperature or a series of increasing crystallization temperatures below the melting temperature until the desired level of crystallinity has been achieved. Any residual solvent can be removed via thermal and/or vacuum treatments. The polymer may also be heated to a temperature at which crystallization is faster than at the solvent exposure temperature. Nucleation agents may also be incorporated via compounding or some other process to promote or control crystallization of the amorphous polymer.

As noted above, the semi-crystalline polymer component of the build composition of the present invention may be characterized by (i) a glass transition temperature ($T_g$) of at least 60° C. and (ii) a minimum crystallization half-time ($t_{1/2}$) of greater than 100 minutes. Glass transition temperature, as well known in the art, is the temperature at which the mechanical properties of a polymer fairly rapidly change glassy to rubbery due to the internal movement of the polymer chains that form the polymer. This change in behavior is typically measured by Differential Scanning Calorimetry (DSC) techniques known in the art and is evidenced for example by a sharp decline in modulus (stiffness) or increase in impact strength as the ambient temperature is increased. Glass transition temperature is measured according to the methods known in the art, such as ASTM E1 356-08(2014). Particularly suitable semi-crystalline polymers for the build composition of the present invention have a glass transition temperature of from 60° C. to 200° C., preferably from 75° C. to 120° C.

Minimum crystallization half-time ($t_{1/2}$), as the phrase is utilized herein, refers to the minimum length of time required to achieve approximately half of the maximum crystallinity achievable at a given crystallization temperature. $t_{1/2}$ depends in part on the crystallization temperature $T_c$, and $t_{1/2}$ is typically at its minimum, i.e., maximum crystallization rate, at a temperature approximately half way between the glass transition temperature ($T_g$) and the melt temperature ($T_m$). Minimum crystallization half-time is determined for the present invention using the small angle light scattering (SALS) technique described below wherein a helium-neon laser is used to measure the time at which the intensity of scattered light increases to half of the maximum scattered intensity achieved. A sample is first melted at a temperature well above the melt temperature to remove all preexisting crystallinity. Then, the sample is rapidly cooled to a predetermined temperature ($T_{cool}$) and the scattered light intensity is recorded as a function of time. The time at which the scattered light intensity increases to half the maximum value denotes the crystallization half-time reported. As crystallization rate varies with temperature, the temperature at which the crystallization rate is the highest in this range (corresponding to the temperature with the minimum crystallization half-time in the temperature range) was chosen to quantify the parameter for comparison purposes hereunder.

Crystallinity level is an indicator of the fraction of crystalline domains in a polymer. Crystallinity level is typically measured by using DSC and is the ratio between the enthalpy of fusion of the polymer and the enthalpy of fusion of a 100% crystalline version of the same polymer. Crystallinity is measured according to methods known in the art, for example as described in ASTM F2625-10(2016).

Suitable semi-crystalline polymers are selected from the group consisting of polyamides, polyesters, copolyesters, polycarbonates, polyether ketones and copolymers thereof.

Particularly suitable semi-crystalline polymers are polyesters, including without limitation copolyesters. In general, such polyesters are formed from one or more acids and one or more glycols (also referred to in the art as diols). The acid component can in some cases include a diacid component and can include for example units derived from a terephthalic acid, units derived from an isophthalic acid, units derived from a cyclohexanedicarboxylic acid, units derived from a naphthalene dicarboxylic acid, units derived from a stilbenedicarboxylic acid, or combinations thereof. The acid component can include units of a first acid and units of one or more second acids. To illustrate, the first acid can include terephthalic acid and, in addition, one or more second acids can be selected from a group of diacids including isophthalic acid, 1,3-cyclohexanedicarboxylic acid, 1,4cyclohexanedicarboxylic acid, a naphthalenedicarboxylic acid, a stilbenedicarboxylic acid, sebacic acid, dimethylmalonic acid, succinic acid, or combinations thereof. In some particular examples, the naphthalenedicarboxylic acid can include 1,4-naphthalenedicarboxylic acid, 1,5-naphthalenedicarboxylic acid, 2,6-naphthalenedicarboxylic acid, or 2,7-naphthalenedicarboxylic acid.

The glycol component can include units derived from cyclohexanedimethanol. The glycol component can include units derived from a first glycol and units derived from one or more second glycols. To illustrate, the first glycol can include cyclohexanedimethanol and the one or more second glycols can include one or more glycols including about 2 to about 20 carbon atoms. In a particular example, the one or more second glycols can include ethylene glycol, 1,2-propanediol, 1,3-propanediol, neopentyl glycol, 1,4-butanediol, 1,5-pentanediol, 1,6-hexanediol, p-xylene glycol, or combinations thereof.

Polyesters, as well as suitable acids and glycols for forming them, are generally described for example in U.S. Published Patent Application Nos. 2012/0329980 and 2017/0066873, both assigned to the assignee of the present invention, the contents and disclosure of which are hereby incorporated herein by reference.

In one embodiment, the build material for additive manufacturing applications includes a build composition in powder form and the build composition includes a semi-crystalline copolyester having a glass transition temperature of at least 60° C., with the semi-crystalline copolyester including 100 mole % terephthalic acid residues, 100–X mole % of a first glycol residue D1 and X mole % of a second glycol residue D2, wherein X, D1 and D2 are selected as follows:

| $D_1$ | $D_2$ | X |
|---|---|---|
| 1,4-cyclohexanedimethanol | 2,2,4,4-tetramethyl-1,3-cyclobutanediol | 29 < X < 100 |
| neopentyl glycol | 2,2,4,4-tetramethyl-1,3-cyclobutanediol | 0 < X < 100 |
| 1,4-cyclohexanedimethanol or ethylene glycol | neopentyl glycol | 29 < X < 100 |
| ethylene glycol | CHDM, spiroglycol or tricyclodecane diol | 20 < X < 57 | wherein the total acid residue content and total glycol residue content are each 100 mole %.

In an embodiment, the build material for additive manufacturing applications includes a build composition in powder form and the build composition includes a semi-crystalline copolyester having a glass transition temperature of at least 60° C., with the semi-crystalline copolyester including 100–X mole % terephthalic acid residues, X mole % isophthalic acid residues and 100 mole % 1,4-cyclohexanedimethanol (CHDM) residues with 43<X<100 and the total acid residue content and total glycol residue content are each 100 mole %.

In an embodiment, the build material for additive manufacturing applications includes a build composition in powder form and the build composition includes a semi-crystalline copolyester having a glass transition temperature of at least 60° C., with the semi-crystalline copolyester including 100 mole % 1,4-cyclohexanedicarboxylic acid (CHDA) residues, 100–X mole % of a first glycol residue D1 and X mole % of a second glycol residue D2, wherein X, D1 and D2 are selected as follows:

| $D_1$ | $D_2$ | X |
|---|---|---|
| 1,4-cyclohexanedimethanol | 2,2,4,4-tetramethyl-1,3-cyclobutanediol | 16 < X < 100 |
| 1-4 butanediol | 1,4-cyclohexanedimethanol | 16 < X < 63 | wherein the total acid residue content and total glycol residue content are each 100 mole %.

In an embodiment, the build material for additive manufacturing applications includes a build composition in powder form and the build composition includes a semi-crystalline copolyester having a glass transition temperature of at least 60° C., with the semi-crystalline copolyester including 100–X mole % terephthalic acid residues, X mole % 1,4-cyclohexanedicarboxylic acid residues and 100 mole % 1,4-cyclohexanedimethanol residues with 31<X<77 and wherein the total acid residue content and total glycol residue content are each 100 mole %.

As described above, the build compositions are preferably in the powder form. As the build composition may include 100% semi-crystalline polymer by volume based on the total volume of the solids fraction of the build composition, the semi-crystalline polymer may be in the form of a powder and the build composition is a semi-crystalline polymer in powder form.

Additional but optional ingredients in the build composition include one or more of crystallizing agents such as nucleating agents; colorants; heat and/or light stabilizers;

heat absorbing agents such as heat absorbing inks; antioxidants, flow aids, and filler materials such as glass, mineral, carbon fibers and like.

When utilized in an additive manufacturing method such as for example a laser sintering process, an important advantage of the build materials of the present invention is that they remain amorphous from the period immediately after being melted/sintered by the laser until they eventually vitrify as they are cooled below the semi-crystalline polymer's glass transition temperature well after the build process is complete. This approach avoids the generation of mechanical stresses caused by crystallization. It also reduces the need for stringent control of temperature gradients across the surface or through the volume of the build. It also enables more of the sintering bed volume to be used and enable scaling up of the sintering bed sizes. It also enables the possibility of not cooling or rapidly cooling the build without the risk of curling or warping of sintered parts. In this regard, the build materials of the present invention address these issues with processing of semi-crystalline polymers and still maintain the advantage of being amorphous after being sintered.

Accordingly, a third aspect of the present invention is an additive manufacturing method for producing a three-dimensional object, said method including the steps of:
  (a) applying a layer of a build material onto a target surface, the build material including a build composition in powder form that includes a semi-crystalline polymer;
  (b) directing electromagnetic wave energy at selected locations of the layer corresponding to a cross-section of a part to be formed in said layer to sinter the build composition at the selected locations; and
  (c) repeating said applying and directing steps to form the part in layerwise fashion; wherein each applying and directing step is much shorter than the minimum crystallization half-time.

As noted above, additive manufacturing methods, and in particular laser sintering processes, are generally known in the art and described for example in laser sintering U.S. Pat. Nos. 6,100,411; 5,990,268 and 8,114,334, the descriptions and disclosure of which are hereby incorporated herein by reference. An important and unexpected advantage of the method of the present invention is that the prior art's requirement of meticulous monitoring and control of the target surface and build environment temperature to avoid later and/or part warping is substantially reduced. Accordingly, the temperature of the part bed in the method of the present invention may vary more than 5° C. over the said total time period for all the applying and directing steps.

In another aspect, the present invention is directed to a polymer article formed via an additive manufacturing process, referred to herein as an additive-manufactured polymer article. An important feature of the present invention resides in the fact that the polymer of an additive-manufactured polymer article formed from the build material of the present invention is amorphous.

The following examples set forth suitable and/or preferred methods and results in accordance with the invention. It is to be understood, however, that these examples are provided by way of illustration and nothing therein should be taken as a limitation upon the overall scope of the invention. Copolyesters in the below examples were manufactured via hydrolytic polycondensation according to standard methods. By way of background, copolyesters typically comprise one or more diacids and one or more diols. The total number of moles of the all the diacids is equal to the total number of moles of all the diols. In the examples below, Copolyester A includes 100 parts terephthalic acid, 69 parts ethylene glycol, and 31 parts 1,4-cyclohexanedimethanol; Copolyester B includes 100 parts terephthalic acid, 50 parts ethylene glycol, and 50 parts 1,4-cyclohexanedimethanol; and Copolyester C includes of 52 parts terephthalic acid, 48 parts isophthalic acid, and 100 parts 1,4-cyclohexanedimethanol.

Example 1

Single Temperature Solvent Annealing of Amorphous Copolyesters

For the two experimental runs in this Example, 10 kg of pellets of Copolyester A and Copolyester C were each separately placed in a 5-gallon polyethylene bucket. A sufficient amount of methyl acetate solvent was poured into the buckets to completely cover the pellets. The pellets were allowed to absorb the solvent for approximately 48 hours. Then, the solvent was drained and the pellets were purged with nitrogen in an oven at 65° C. for 16 hours. The solvent crystallized pellets were then purged in nitrogen and annealed at temperature close to the polymer's melting point as indicated in Table 1 below. Polymer melt point and glass transition temperature were measured using DSC according to methods described in ASTM E1356-08(2014) and ASTM F2625-10(2016).

TABLE 1

| Polymer | Annealing temp (° C.) | Melting temp (° C.) | Glass transition temperature (° C.) | Heat of melting (J/g) | Crystallinity (%) |
| --- | --- | --- | --- | --- | --- |
| Copolyester A | 160 | 177.56 | 81.25 | 20.79 | 14.85 |
| Copolyester C | 180 | 192.65 | 80.96 | 22.17 | 15.83 |

Example 2

Solvent Annealing at Multiple Temperatures

Solvent annealing at multiple temperatures (temperatures increasing in a step-wise manner) was performed in this Example. More specifically, each of Copolyesters A, B and C and a polycarbonate commercially available from Makrolon under the trade name PC2608 were separately treated with solvents as indicated below and subjected to an annealing process as indicated below. Conditions and the melting temperature based on DSC for the different polymers, along with crystallinity as measured by DSC, are listed in Table 2 (melt point, glass transition temperature and crystallinity were measured using DSC according to methods described in ASTM E1356-08(2014) and ASTM F2625-10(2016)). To estimate crystallinity level according to ASTM F2625-10 (2016), the theoretical heats of fusion of 100% crystalline polymers of similar compositions are needed. Here, the theoretical heat of fusion for copolyesters is assumed to be 140 J/g (heat of fusion of PET or polyethylene terephthalate) and for polycarbonate between 109 to 142 J/g (J. P. Mercier, R. Legras, J. Polym Sci., "Correlation Between The Enthalpy Of Fusion And The Specific Volume Of Crystallized Polycarbonate Of Bisphenol A", Polymer Letters, 1970, 8, 645; L. D. Jones, F. E. Karasz, J. Polym. Sci., "Heat Of Fusion of Flexan Polycarbonate", Polymer Letters, 1966, 4, 803).

TABLE 2

| Polymer (weight in kg) | Solvent (weight in kg) | Solvent annealing process (hours, h @ temp) | Glass transition temp. (° C.) | Melting temp. (° C.) | Heat of melting (J/g) | Crystallinity (%) |
|---|---|---|---|---|---|---|
| Copolyester A (22.7) | Mix1* (22.7) | 48 h room, 4 h 80 C., 4 h 120 C., 4 h 140 C., 4 h 160 C., 12 h 160 C. | 81.25 | 186.70 | 15.84 | 11.31 |
| Copolyester B (22.7) | Acetone (1.7) | 24 h room, 8 h 120 C., 8 h 140 C., 8 h 155 C., 8 h 165 C., 12 h 175 C. | 80.27 | 192.71 | 17.89 | 12.78 |
| Copolyester C (22.7) | Acetone (0.22) | 1 h room, 4 h 120 C., 4 h 180 C. | 83.05 | 193.73 | 19.97 | 14.26 |
| PC2608 (10) | Mix 2** (10) | 48 h room, 4 h 190 C., 4 h 200 C., 16 h 210 C. | 148.05 | 230.0 | 20.92 | 19.19-14.70 |

*Mix1: Methyl acetate:water (4:1 weight ratio),
**Mix2: Methyl acetate:water (1:3 weight ratio)

Example 3

Calculation of Minimum Crystallization Half-Time

The minimum crystallization half-time of Copolyesters A, B and C were each measured using SALS with multiple runs using a range of temperatures. The minimum crystallization half-time values are set forth in Table 3 below.

TABLE 3

| Polymer | $t_{1/2}$ (min) |
|---|---|
| Copolyester A | 467 |
| Copolyester B | 570 |
| Copolyester C | 146 |

Example 4

Additive Manufacturing

In this example, Copolyesters A, B and C were each separately processed into a form suitable for use as build material for additive manufacturing. More specifically, the polymer was cryo-ground into powder with a particle size between 10 and 200 μm. A Voxeljet™ VX200 high speed sintering (HSS) machine was used to manufacture specimens from each powder sample that were suitable for tensile testing in accordance with the ASTM D638 Type 1 standard. In a first set of tests, the results of which are set forth in Table 4, 5 and 6 below, bed temperature was set for each run as indicated in the tables below and the printed specimens were removed immediately from the print bed and tested for mechanical properties. In a second set of tests, the results of which are set forth in Table 7 and 8, bed temperature was held constant at a set temperature of 160° C. for Copolyester A and Copolyester C for all the runs and printed specimens were either (i) removed from the print bed and tested for tensile properties (labeled "no cooling" in Table 7 and 8) or (ii) allowed to cool overnight prior to tensile testing (labeled "overnight cooling" in Table 7 and 8). Tensile testing of the specimens performed on a Tinius Olsen H5KS tensometer with a H500L laser extensometer at a strain rate of 5 mm/min, in accordance with ASTM D638. Tensile testing data, more specifically Young's modulus or modulus (Y), ultimate tensile strength (UTS), and elongation at break (EAB) for the specimens formed from annealed Copolyester A are reported in Table 4 and Table 7 below, from annealed Copolyester B are reported in Table 5, and annealed Copolyester A are reported in Table 6 and Table 8.

The data in Tables 4, 5 and 6 indicates that, so long as the radiation source is able to supply sufficient heat to melt and sinter the material mechanical properties of the build materials of the present invention are suitable for producing a wide variety of articles via additive manufacturing. Interestingly, it was possible to print parts without visible warping at a range of bed temperatures (including room temperature), which is not typically possible in nylon 12 due to the need to establish and maintain a specific bed temperature to avoid the negative impact of the relatively fast crystallization kinetics of nylon 12. This ability to print at a range of bed temperatures highlights the unexpected and surprising advantage of the build materials and build compositions of the present invention.

TABLE 4

| (Copolyester A) | | | |
|---|---|---|---|
| Bed temperature (° C.) | Y (MPa) | UTS (MPa) | EAB (%) |
| Room temperature | 942 ± 361 | 12.86 ± 3.60 | 2.42 ± 0.54 |
| 135 | 348 ± 133 | 3.94 ± 1.77 | 1.88 ± 0.30 |
| 140 | 1308 ± 133 | 20.50 ± 1.90 | 3.29 ± 0.28 |
| 145 | 1492 ± 133 | 23.42 ± 1.70 | 3.62 ± 0.22 |
| 150 | 1532 ± 430 | 25.24 ± 2.30 | 3.13 ± 1.85 |
| 155 | 1524 ± 780 | 26.42 ± 6.10 | 3.33 ± 2.78 |
| 160 | 1694 ± 630 | 30.52 ± 1.90 | 3.82 ± 1.79 |

TABLE 5

| (Copolyester B) | | | |
|---|---|---|---|
| Bed temperature (° C.) | Y (MPa) | UTS (MPa) | EAB (%) |
| Room temperature | 1532 ± 840 | 6.89 ± 2.27 | 0.39 ± 0.09 |
| 140 | 875 ± 637 | 3.20 ± 1.30 | 0.42 ± 0.16 |
| 145 | 980 ± 337 | 5.24 ± 2.67 | 0.50 ± 0.17 |
| 150 | 1503 ± 740 | 7.39 ± 1.77 | 0.50 ± 0.28 |
| 155 | 1530 ± 600 | 8.77 ± 3.88 | 0.53 ± 0.37 |
| 160 | 1706 ± 752 | 10.57 ± 1.34 | 0.58 ± 0.39 |

TABLE 6

(Copolyester C)

| Bed temperature (° C.) | Y (MPa) | UTS (MPa) | EAB (%) |
|---|---|---|---|
| Room temperature | 1121 ± 533 | 9.75 ± 1.98 | 2.42 ± 0.1 |
| 140 | 363 ± 171 | 2.45 ± 0.84 | 0.79 ± 0.28 |
| 145 | 604 ± 270 | 5.26 ± 2.34 | 0.89 ± 0.15 |
| 150 | 1438 ± 750 | 14.03 ± 4.80 | 1.01 ± 0.43 |
| 155 | 1525v300 | 14.05 ± 2.00 | 0.88 ± 0.12 |
| 160 | 1934 ± 570 | 15.18 ± 1.80 | 0.76 ± 0.18 |
| 165 | 1867 ± 560 | 15 ± 1.50 | 0.8 ± 0.23 |

TABLE 7

(Copolyester A)

| Cooling process | Y (MPa) | UTS (MPa) | EAB (%) |
|---|---|---|---|
| No cooling | 1694 ± 630 | 30.52 ± 1.90 | 3.82 ± 1.79 |
| Overnight cooling | 1754 ± 520 | 24.24 ± 3.20 | 1.82 ± 0.56 |

TABLE 8

(Copolyester C)

| Cooling process | Y (MPa) | UTS (MPa) | EAB (%) |
|---|---|---|---|
| No cooling | 1934 ± 570 | 15.18 ± 1.80 | 0.76 ± 0.18 |
| Overnight cooling | 1723 ± 330 | 13.17 ± 2.2 | 0.71 ± 0.21 |

The data in Tables 7 and 8 demonstrates the manufacture of specimens with suitable-for-use properties and characteristics (such as dimensional stability) regardless of variation in the cooling processes. This is stark contrast to prior art polymers such as nylon 12, for which the parts need to be cooled down slowly, with cooling steps sometimes longer than 8 hours, to prevent warping resulting from the fast crystallizing kinetics. The build materials of present invention allow for removal of parts from the printing equipment immediately after the printing process is complete, thus obviating the need for a long cooling step and significantly shortening the cycle time.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. An additive manufacturing method for producing a three-dimensional object, said method comprising the steps of:
   (a) applying a layer of a build material onto a target surface, said build material comprising a build composition in powder form that includes a semi-crystalline polymer having a minimum crystallization half-time greater than 100 minutes;
   (b) directing electromagnetic wave energy at selected locations of said layer corresponding to a cross-section of a part to be formed in said layer to sinter said build composition at said selected locations; and
   (c) repeating said applying and directing steps over a total time period for all the applying and directing steps to form said part in layerwise fashion;
   wherein each applying and directing step is performed in a much shorter time than the minimum crystallization half-time,
   wherein the temperature of said target surface varies more than 5° C. over said total time period; and
   wherein said semi-crystalline polymer is a crystallized amorphous polymer.

2. The method according to claim 1, wherein the build material comprises a build composition in powder form, said build composition comprising a semi-crystalline polymer having a glass transition temperature from 60° C. to 2 00° C. and a minimum crystallization half-time of greater than 100 minutes, wherein said semi-crystalline polymer is a crystallized amorphous polymer having a crystallinity of from 10% to 30% measured by DSC according to ASTM F2625-10 (2016).

3. The method according to claim 2 wherein said semi-crystalline polymer is selected from the group consisting of polyamides, polyesters, polycarbonates, acrylics, polystyrene, polyether ketones and copolymers thereof.

4. The method according to claim 3 wherein said semi-crystalline polymer is a polyester or copolyester.

5. The method according to claim 3 wherein said semi-crystalline polymer is a polycarbonate.

6. The method according to claim 2, wherein the build composition further comprises one or more of crystallizing agents such as nucleating agents; colorants; heat stabilizers; light stabilizers; heat absorbing agents such as heat absorbing inks; anti-oxidants, flow aids, and filler materials such as glass, mineral and carbon fibers.

7. The method according to claim 2, wherein the semi-crystalline polymer is selected from the group consisting of polyesters, copolyesters, polycarbonates and polyether ketones.

8. The method according to claim 2, wherein said semi-crystalline polymer is a copolyester that comprises an acid component comprising 100 mole % terephthalic acid residues, and a glycol component comprising glycol residues chosen from:
   (1) 100–X mole % 1,4-cyclohexanedimethanol residues and X mole % 2,2,4,4-tetramethyl-1,3-cyclobutanediol residues, wherein 29<X<100; or
   (2) 100–X mole % neopentyl glycol residues and X mole % 2,2,4,4-tetramethyl-1,3-cyclobutanediol residues, wherein 0<X<100; or
   (3) 100 –X mole % 1,4-cyclohexanedimethanol or ethylene glycol residues and X mole % neopentyl glycol residues, wherein 29<X<100; or
   (4) 100–X mole % ethylene glycol residues and X mole % 1,4-cyclohexanedimethanol or spiroglycol or tricyclodecane residues, wherein 20<X<57;

wherein the total acid residue content and total glycol residue content are each 100 mole %.

9. The method according to claim 2, wherein said semi-crystalline polymer is a copolyester that comprises a glycol component comprising 100 mole % 1,4-cyclohexanedimethanol residues and an acid component comprising acid residues chosen from:
   (1) 100–X mole % terephthalic acid residues and X mole % isophthalic acid residues, wherein 43<X<100; or
   (2) 100–Y mole % terephthalic acid residues and Y mole % 1,4-cyclohexanedicarboxylic acid residues, wherein 31<Y<77;
   wherein the total acid residue content and total glycol residue content are each 100 mole %.

10. The method according to claim 2, wherein said semi-crystalline polymer is a copolyester that comprises an acid component comprising 100 mole % 1,4-cyclohexanedicarboxylic acid residues, and a glycol component comprising glycol residues chosen from:
    (1) 100–X mole % 1,4-cyclohexanedimethanol residues and X mole % 2,2,4,4-tetramethyl-1,3-cyclobutanediol residues, wherein 16<X<100; or
    (2) 100–X mole % 1,4-butanediol residues and X mole % 1,4-cyclohexanedimethanol residues, wherein 16<X<63;
   and wherein the total acid residue content and total glycol residue content are each 100 mole %.

11. A three-dimensional object formed according to the method of claim 1, wherein the three-dimensional object comprises a polymer that is amorphous.

* * * * *